Figure 3:
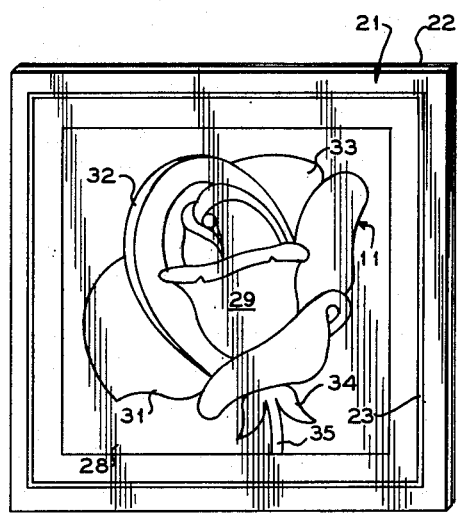

March 16, 1954
A. BRUSETTI
2,671,978
METHOD OF CARVING STONE
Filed Jan. 21, 1952
6 Sheets-Sheet 1
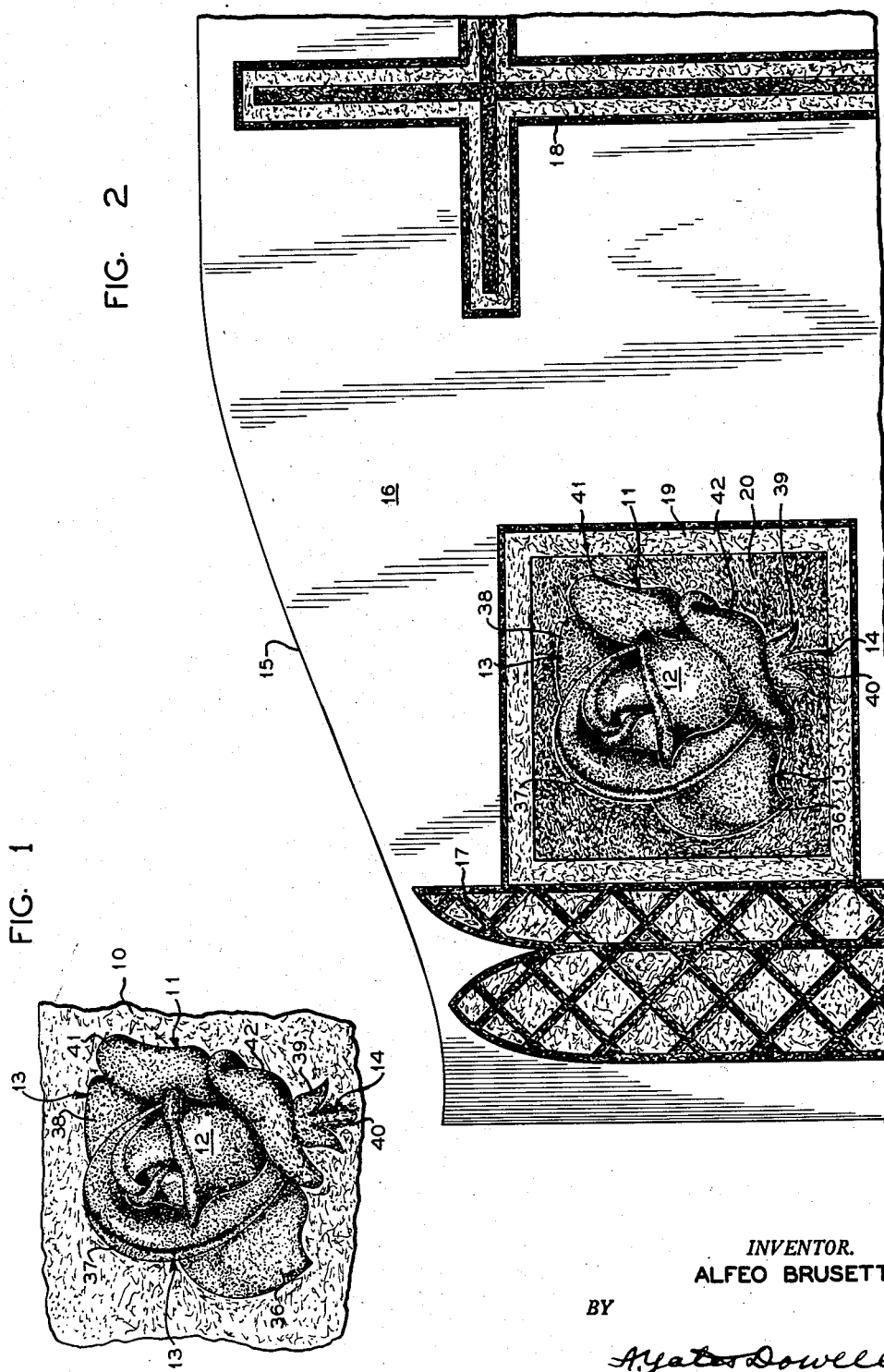
INVENTOR.
ALFEO BRUSETTI
BY
*A. Yates Dowell*
ATTORNEY March 16, 1954 A. BRUSETTI 2,671,978
METHOD OF CARVING STONE
Filed Jan. 21, 1952 6 Sheets-Sheet 2

INVENTOR.
ALFEO BRUSETTI
BY
A. Yates Dowell
ATTORNEY

March 16, 1954     A. BRUSETTI     2,671,978
METHOD OF CARVING STONE

Filed Jan. 21, 1952     6 Sheets-Sheet 3

*INVENTOR.*
ALFEO BRUSETTI
BY A. Yates Dowell
ATTORNEY

March 16, 1954  A. BRUSETTI  2,671,978
METHOD OF CARVING STONE
Filed Jan. 21, 1952  6 Sheets-Sheet 4

INVENTOR.
ALFEO BRUSETTI
BY
ATTORNEY

March 16, 1954 A. BRUSETTI 2,671,978
METHOD OF CARVING STONE
Filed Jan. 21, 1952 6 Sheets-Sheet 5

INVENTOR.
ALFEO BRUSETTI
BY
A. Yates Dowell
ATTORNEY

March 16, 1954 A. BRUSETTI 2,671,978
METHOD OF CARVING STONE
Filed Jan. 21, 1952 6 Sheets-Sheet 6

INVENTOR.
ALFEO BRUSETTI
BY
*A. yates Dowell*
ATTORNEY

Patented Mar. 16, 1954

2,671,978

UNITED STATES PATENT OFFICE 2,671,978

METHOD OF CARVING STONE

Alfeo Brusetti, Barre, Vt., assignor to Modern Granite Company, Inc., Barre, Vt., a corporation of Vermont Application January 21, 1952, Serial No. 267,459

2 Claims. (Cl. 41—39)

1

This invention relates to stone working and more particularly to a method of carving a design, specifically a flower, in bas-relief in stone or other relatively hard materials.

Heretofore the production of designs, particularly flowers, in bas-relief in stone has been accomplished by means of hand carving. This carving has been done by pneumatic tool and chisel or by a mallet and chisel. Obviously, such hand methods are time consuming and often result in damage to the stone due to the repeated impacts of the hammer and chisel which, in view of the brittle nature of the material in which the design is being carved, causes chipping of the edges of the design and thereby produces results which are imperfect and often not pleasing to the eye.

In carrying out the process of this invention a high velocity stream of abrasive material is utilized in conjunction with a mask, portions of which may be removed to permit application of the abrasive to the stone and thus wear or grind away these portions of the stone to present the design in the desired bas relief.

It is therefore an object of the invention to provide a method of carving a design in stone or other relatively hard material in bas-relief which method avoids sudden or repeated shock to the material and results in the production of a design having finely outlined edges.

A further object of the invention is the provision of a method of carving a design in bas-relief in stone or other relatively hard material which may be carried out by relatively unskilled persons and which will produce a design of delicate and pleasing appearance.

A still further object of the invention is the provision of a method of carving a design, specifically a rose, in bas-relief in stone or other relatively hard material which process provides an accurate and delicate reproduction of the rose with fine edges or outlines and in which chipping of the edges is avoided.

Further objects and advantages of the invention will be apparent from the following description taken in conjunction with the accompanying drawings wherein:

Fig. 1 is a fragmentary elevational view of a flower produced in bas-relief in stone by the process of this invention;

Fig. 2, a fragmentary front elevational view of a monument showing a flower carved therein by the process of this invention;

Fig. 3, a perspective view of a mask utilized in the process of this invention with a design to be produced applied thereto;

2

Figure 4:
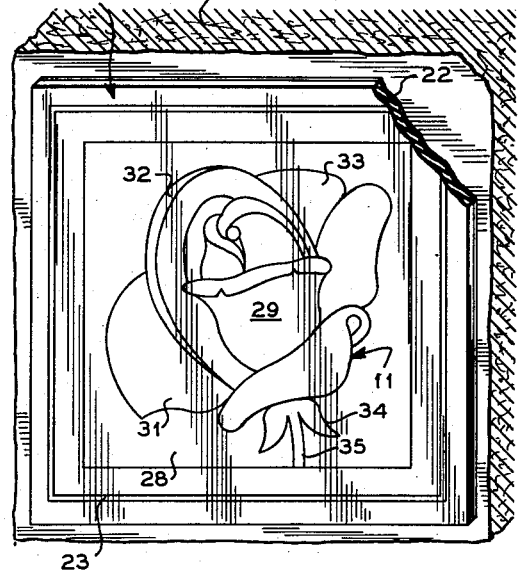
Figure 5:
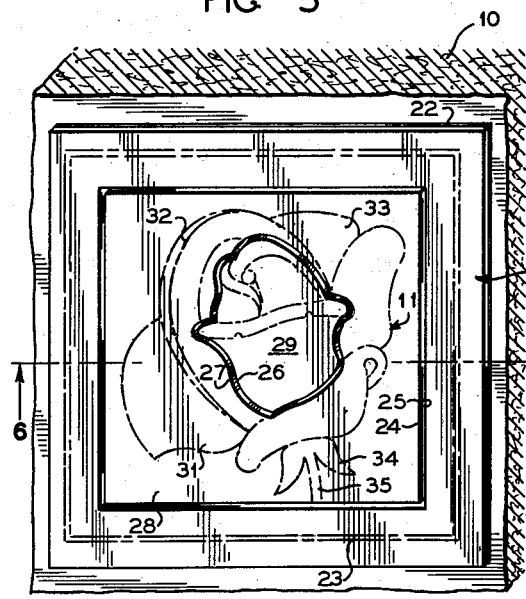
Figure 6:
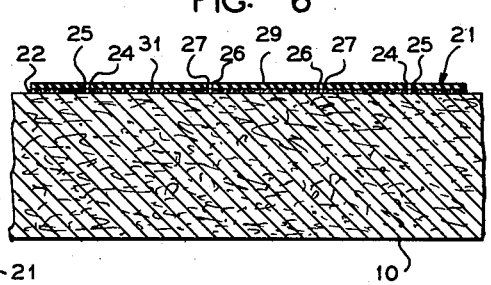
Figure 7:
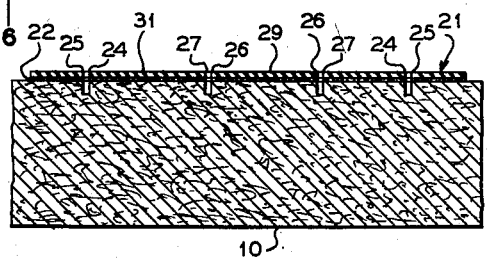
Figure 8:
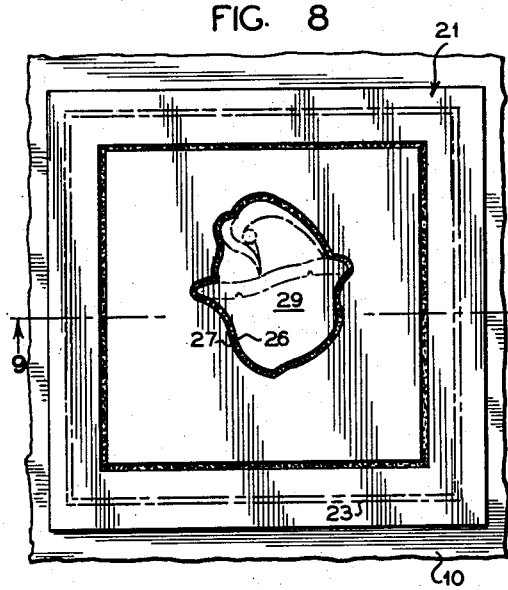
Figure 9:
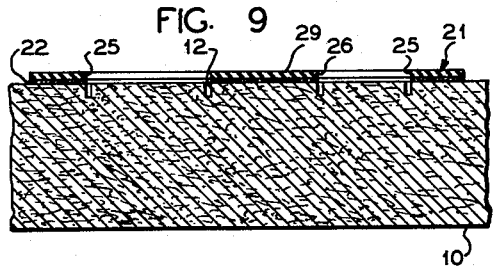
Figure 10:
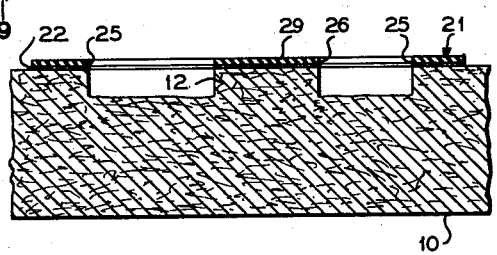
Figure 11:
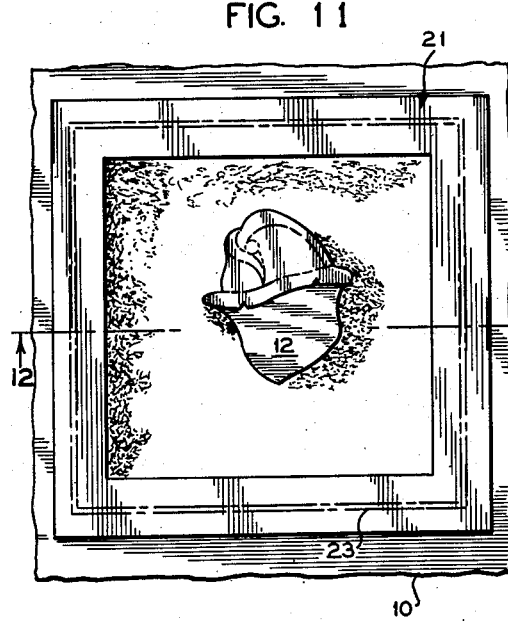
Figure 12:
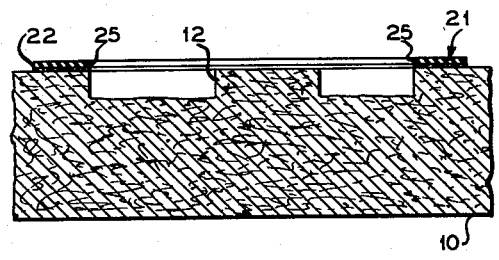
Figure 13:
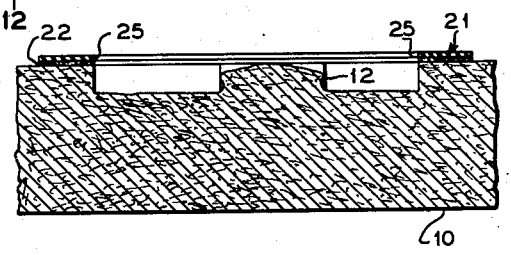
Figure 14:
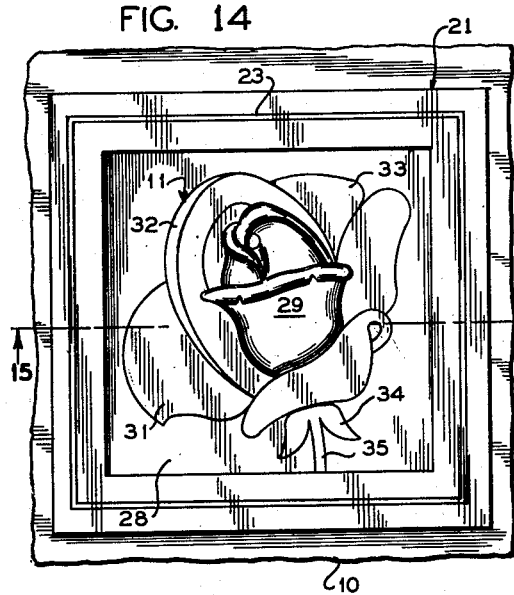
Figure 15:
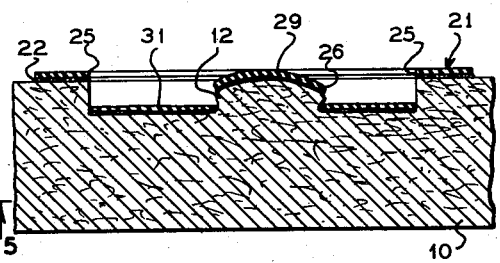
Figure 16:
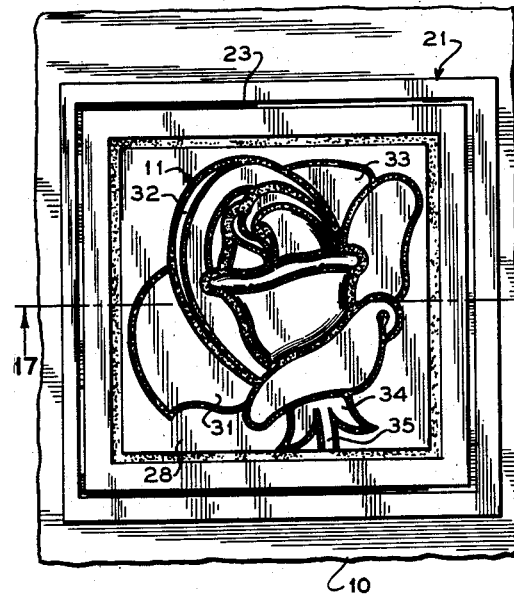
Figure 17:
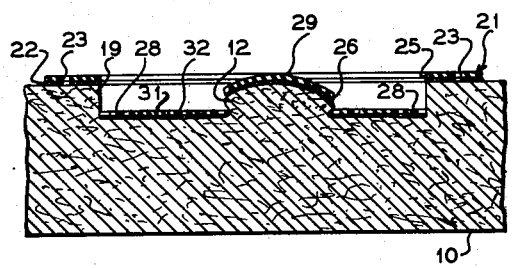
Figure 18:
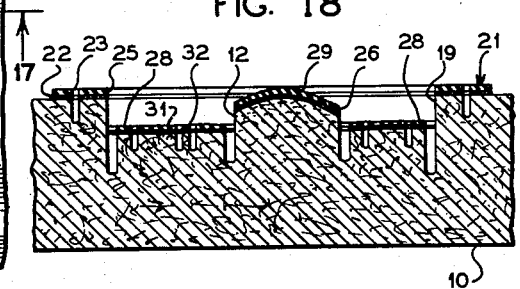
Figure 19:
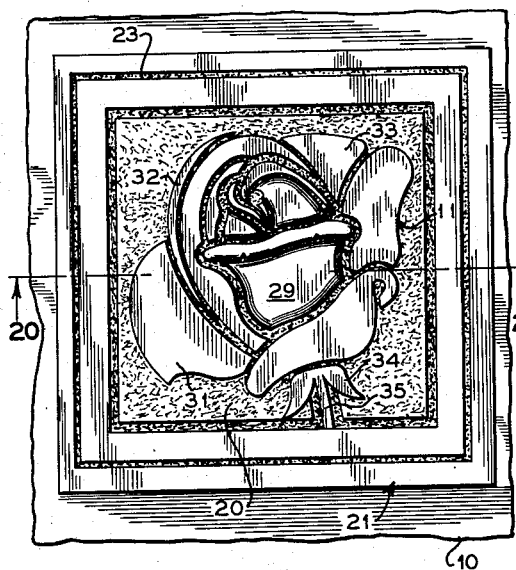
Figure 20:
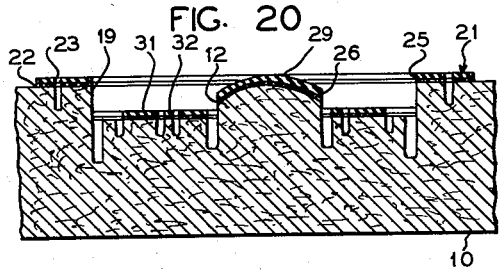
Figure 21:
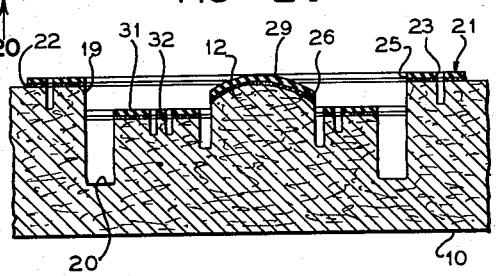
Figure 22:
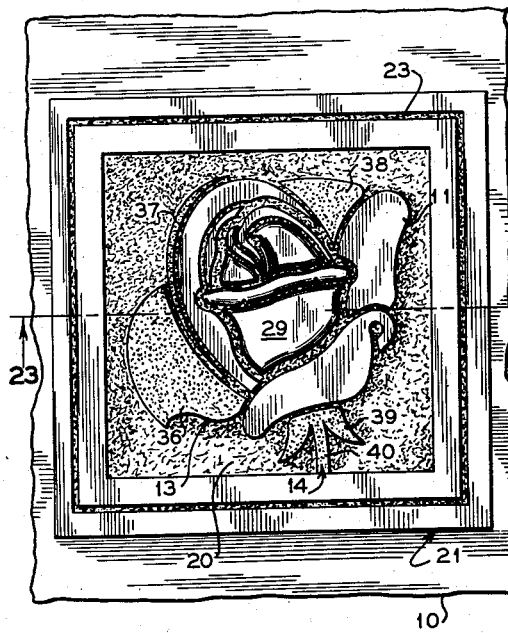
Figure 23:
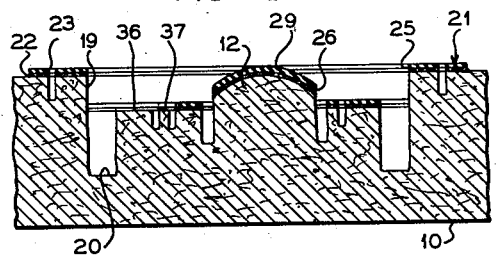
Figure 24:
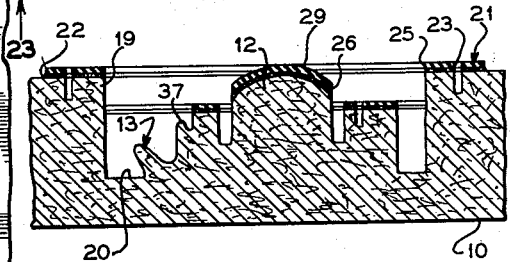
Figure 25:
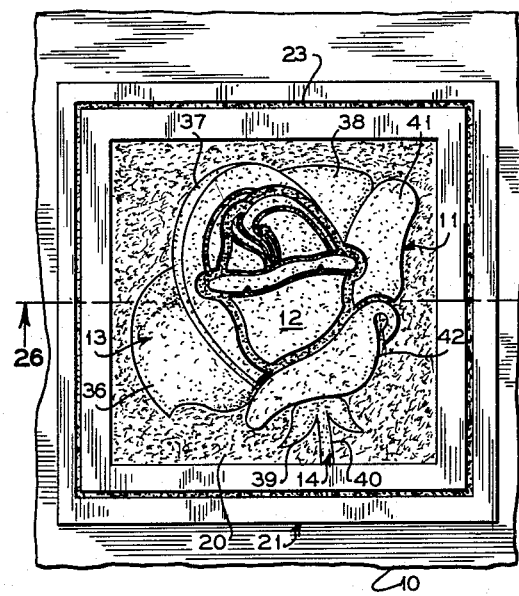
Figure 26:
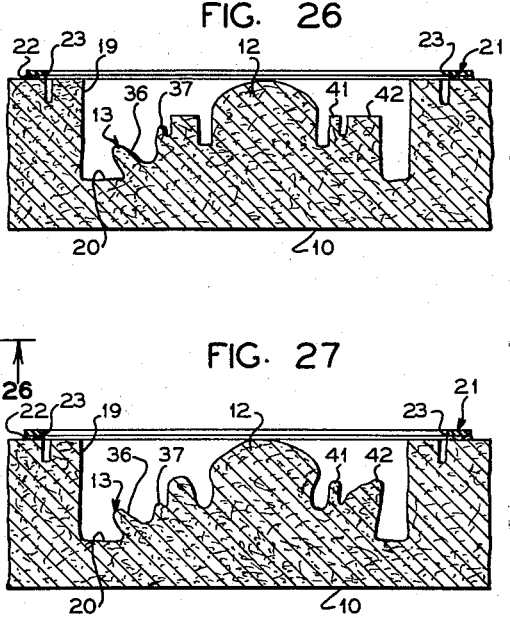
Figure 27:
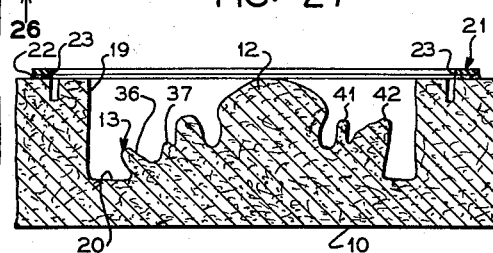
Figure 28:
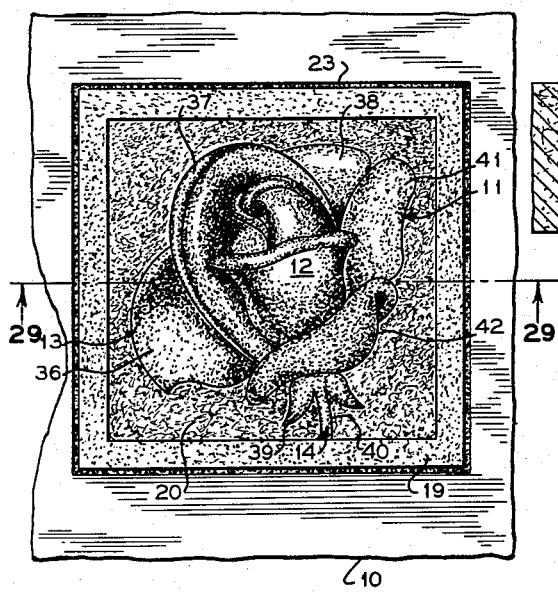
Figure 29:
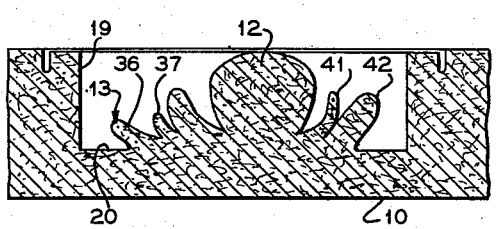

Fig. 4, a perspective view of the mask of Fig. 3 applied to the surface of a block of stone with parts broken away for greater clarity;

Fig. 5, a perspective view showing portions of the mask which have been removed defined by full lines and the remaining portions of the mask in phantom;

Fig. 6, a sectional view on the line 6—6 of Fig. 5;

Fig. 7, a sectional view similar to Fig. 6 and showing the stone after the first cutting operations;

Fig. 8, an elevational view showing further portions of the mask removed preparatory to the second cutting operation;

Fig. 9, a sectional view on the line 9—9 of Fig. 8;

Fig. 10, a sectional view similar to Fig. 9 and showing the stone after the second cutting operation;

Fig. 11, an elevational view showing a portion of the mask covering the flower bud removed for a rough shaping operation;

Fig. 12, a sectional view on the line 12—12 of Fig. 11;

Fig. 13, a sectional view similar to Fig. 12 and showing the stone after the first rough shaping operation;

Fig. 14, an elevational view showing the previously removed portions of the mask replaced on the stone;

Fig. 15, a sectional view on the line 15—15 of Fig. 14;

Fig. 16, an elevational view showing the mask applied to the stone and with additional portions cut out and removed;

Fig. 17, a sectional view on the line 17—17 of Fig. 16;

Fig. 18, a sectional view similar to Fig. 17 and showing the stone after a subsequent cutting operation;

Fig. 19, an elevational view showing the mask applied to the stone and with a further portion thereof removed;

Fig. 20, a sectional view on the line 20—20 of Fig. 19;

Fig. 21, a sectional view similar to Fig. 20 and showing the stone after a further cutting operation;

Fig. 22, an elevational view showing the mask applied to the stone and with the portions covering the lower-most petals and stem removed;

Fig. 23, a sectional view on the line 23—23 of Fig. 22;

Fig. 24, a sectional view similar to Fig. 23 and showing certain of the petals after a rough shaping operation;

Fig. 25, an elevational view showing the partially completed flower and background and with all portions of the mask removed;

Fig. 26, a sectional view on the line 26—26 of Fig. 25;

Fig. 27, a sectional view similar to Fig. 26 and showing the stone after the final rough shaping operation;

Fig. 28, an elevational view showing the stone after the final finishing operations; and Fig. 29, a sectional view on the line 29—29 of Fig. 28.

With continued reference to the drawing there is shown in Fig. 1 a block of stone 10 having carved thereon in bas-relief by the process of this invention a rose 11 which is provided with the usual bud portion 12, petals 13, and a stem 14. As will be seen, the rose is delicate and lifelike in appearance and the same may be carved in accordance with the process of this invention with finely outlined edges which, due to the absence of sudden shock and impact, do not have chipped or other defaced portions. Other flower designs than roses may be produced by the process of this invention if desired, but for the purpose of illustration a rose has been selected as being best illustrative of the process, and consequently this description will deal primarily with a rose design.

Such a rose as shown in Fig. 1 or other varieties of roses may be utilized wherever desired, for instance on a monument and as shown in Fig. 2, such a monument may comprise a relatively large block of stone 15 having a flat front face 16 upon which various designs such as those shown at 17 and 18 may be carved and also upon which the rose 11 may be carved in bas-relief. As will be seen from an inspection of this figure, the rose 11 is carved in such a way that a frame 19 is provided which serves to accentuate the rose 11 and obviously any configuration of frame 19 such as a rectangle, oval, circle, or any geometric pattern may be employed in order to properly set off the rose 11 in a pleasing and artistic manner.

Also as shown in Fig. 2 the background 20 may be made in a shade contrasting to the rose 11, background 20 being either darker or lighter than the rose, and such a contrast serves to further accentuate the design.

In carrying out the process of this invention the desired stone is removed by an abrading operation and while this may be termed sandblasting, nevertheless since sand is not actually used in this process it is preferred in this description to refer to the process as abrading. In the normal operation of this process two types of abrading material are used, depending on how rapid a cutting operation is desired and also how much stone is to be removed. One abrasive material which is utilized for removing relatively small amounts of stone and for fine shaping operations is fine steel shot of the order of number 50. These shot must be thoroughly cleaned of all dust before each operation which will result in providing a white finish on the stone. The second abrasive material is Carborundum dust of the order of number 45 and this dust is utilized in abrading operations where it is desired to remove a relatively large quantity of stone, and to provide a bluish appearance to the surface thereof. The abrasive process utilizing the steel shot may be termed a shaping process and that utilizing the Carborundum dust may be termed a blowing process.

The abrasive material is applied to the work in a high velocity stream through nozzles and these nozzles may be of varying sizes and shapes, in order to produce the desired configuration in the stone and to permit working in relatively confined spaces, and also the size of the nozzles depends to a great extent on the quantity of stone to be removed within a given period of time.

The process also contemplates the use of a mask of rubber or other similar material which is resistant to the abrasive materials utilized in the shaping and blowing operations which mask is applied to the stone and portions thereof removed as desired in order to expose portions of the stone to be removed by either of the above mentioned abrasive processes. The specific manner of utilizing the mask and the abrading processes to carve a rose or other flower design in stone or similar relatively hard materials will now be described.

A mask of rubber or other suitable material which is resistant to the abrasives utilized in the abrading operations may be cut from a sheet of such material to the desired shape and size and, as shown in Fig. 3, this may take the form of a rectangular sheet 21 having a layer 22 of a pressure-sensitive adhesive by means of which the mask 21 may be secured to the surface of a block of stone or other material in which the design is to be carved. The design is first laid out on paper and such design is then transferred to the surface of the mask 21 by any desired method. As shown in Fig. 3 the design comprises a rose 11 within a frame 19, the frame being outlined by a relatively narrow groove indicated by spaced lines 23.

As shown in Fig. 4 the mask 21 is cemented by use of liquid filler cement compound to the surface of a block of stone or other relatively hard material 10 in which a design is to be carved, the adhesive backing 22 of the mask 21 together with the liquid filler cement compound serving to securely attach the same to the surface of the stone 10. As shown in Figs. 5 and 6 around the inner edge of the frame 19 two lines 24 and 25 spaced approximately $\frac{1}{16}$ inch are cut through the mask 21 and the portion of the mask between these lines is removed as shown in Fig. 6. Likewise, around the bud portion 11 lines 26 and 27, spaced approximately $\frac{1}{16}$ inch apart are cut through the mask and as shown in Fig. 6 the portion of the mask between these lines is also removed. After removal of these portions of the mask 21 the stone exposed thereby is abraded to a depth of approximately $\frac{1}{8}$ inch by subjecting the same to a high-velocity blast of Carborundum powder. This will result in forming grooves in the surface of the stone as shown in Fig. 7. After completion of this abrading operation the portion of the mask 28 between the bud 12 and the inner edge of the frame 19 is removed and carefully preserved, as this portion of the mask is replaced on the stone during a later step of the process. Figs. 8 and 9 show these portions of the mask 21 removed, and thereupon the exposed portion of the stone 10 is subjected to an abrading operation with fine steel shot to remove such stone to a depth of approximately $\frac{1}{4}$ inch. This provides a groove with the portion 29 of the mask applied to the bud portion 12 remaining in place. The stone is now in the condition shown in Fig. 10.

The portion 29 of the mask 21 which covers the bud 12 is now cut out along the lines indicated in Fig. 11 and each cut out section of the mask is removed one at a time and the exposed portion of the stone therebeneath roughly shaped by abrading with steel shot to provide the general outline and the curvature of the bud portion 12 of the rose 11. Each portion of the mask which is removed during this step of the process is carefully preserved for subsequent use. All parts of the mask which were removed during the previous operations are replaced on the stone as shown in Figs. 14 and 15. All lines on the mask are now cut out to a width of approximately 1/16 inch with the exception of those lines around the bud 12 and the line around the inner edge of the frame 19 which are cut out to a width somewhat wider than the previously mentioned line. These portions of the mask are removed as shown in Figs. 16 and 17 leaving grooves therein through which the exposed stone is abraded by the application of Carborundum dust to the maximum depth possible. Due to the relatively wider grooves around the bud 12 and the inner edge of the frame 19 these portions will be abraded to a greater depth than those constituting the other line on the mask. The result of such abrading operation is shown in Fig. 18. The portion 28 of the mask between the outermost lines of the rose 11 are now removed as shown in Figs. 19 and 20 and the exposed portion of the stone is abraded with Carborundum dust to remove the stone to a depth of approximately one inch. The results of this abrading operation are shown in Fig. 21.

The portions of the mask 31, 32, 33, 34, and 35 which cover the stone forming petals 36, 37, 38, 39, and stem 40, are next removed as shown in Figs. 22 and 23 and these petals and stem roughly shaped by abrading with fine shot. The results of this rough shaping operation are shown in Fig. 24. All of the portions of the rose are now roughly shaped with the exception of petals 41 and 42. All remaining parts of the mask are now removed and the petals 41 and 42 are rough shaped, after which all of the parts of the rose are brought to final configuration by abrading with fine steel shot. This results in a rose having a fine, delicate appearance and the stone is properly undercut to form the petal, which, by this process may be accomplished without danger of chipping relatively thin edges of the petals. During this latter stage of the process, the inner edges of the frame are cut square and perpendicular in order to present a pleasing appearance and as a final step of the process the background is given a relatively short blast of Carborundum dust in order to present a bluish appearance in contrast to the white appearance of the rose itself. The final rose is shown in Figs. 28 and 29.

It will be seen that by the above described process there has been provided a method of making or carving a rose in bas-relief in stone or other relatively hard material in which the highly developed skill required for hand carving with a chisel and mallet or with a pneumatic hammer and mallet is not necessary in that there is no danger of breaking away the thin edges of the petals and other parts of the rose, and furthermore most parts of the rose are protected during the abrading operation and it is only necessary to direct the abrasive stream on the exposed portions of the stone from which the mask has been removed, since the design has been previously prepared and laid out. It is only necessary for the workman to follow a proper sequence in applying and removing the mask and in reapplying certain portions thereof and to properly direct the abrasive stream at the exposed portions of the stone in order to wear the same away and to produce the desired design in bas-relief.

It will be obvious to those skilled in the art that various changes may be made in the invention without departing from the spirit and scope thereof, and therefore the invention is not limited by that which is shown in the drawings and described in the specification, but only as indicated in the attached claims.

What is claimed is:

1. The method of carving a design in bas relief in hard material comprising, providing a mask of sheet material which is resistant to abrasion from a stream of particulate abrading material, applying a design on the mask to indicate lines of cuts to be made in the mask, applying and fixing the mask to the hard material and cutting out selected portions of the mask where the stone is to be abraded, removing such cut-out portion of the mask intact and preserving such cut-out portion, abrading the hard material with a stream of abrading material applied directly to the hard material where said cut-out portion of the mask has been removed until the desired depth is obtained, replacing the same cut-out portion of the mask on the hard material and removing a second different cut-out portion immediately contiguous to the first cut-out portion of the mask and preserving such different cut-out portion intact, abrading the uncovered portion of the hard material to the desired depth and continuing the process until the desired article is obtained.

2. The method of carving a design in bas relief in stone comprising providing a mask of sheet material resistant to the cutting action of a stream of particulate abrading material, applying a design on the mask to indicate the area to be cut, securing the mask to the stone, and removing portions of the mask where the stone is to be cut, removing and preserving intact such cut-out portions of the mask, cutting the stone with a stream of abrading material applied through the cut-out portions until the desired depth is obtained, replacing the cut-out portions of the mask on the stone, removing a second different cut-out portion immediately contiguous to the first cut-out portion of the mask, abrading the second uncovered area of the stone to the desired depth, and continuing the process until the desired result is obtained.

ALFEO BRUSETTI.

References Cited in the file of this patent

UNITED STATES PATENTS

| Number | Name | Date |
|---|---|---|
| 1,627,456 | Philip | May 3, 1927 |
| 1,667,309 | Chase | Apr. 24, 1928 |
| 1,720,567 | Philip | July 9, 1929 |
| 2,016,593 | Cleveland | Oct. 8, 1935 |
| 2,062,865 | Cleveland | Dec. 1, 1936 |
| 2,327,019 | Chruma | Aug. 17, 1943 |